United States Patent [19]

Dyszlewski

[11] 4,173,594

[45] Nov. 6, 1979

[54] THERMOSETTING LACQUER COMPOSITIONS

[75] Inventor: Zygmunt D. Dyszlewski, Lake City, Pa.

[73] Assignee: Lord Corporation, Erie, Pa.

[21] Appl. No.: 552,505

[22] Filed: Feb. 24, 1975

[51] Int. Cl.² ............................................. C08L 63/00
[52] U.S. Cl. .............................. 525/498; 260/31.2 N; 260/31.2 T; 260/33.6 UB; 260/33.8 UB; 428/262; 428/424; 428/460; 428/506; 525/429; 525/456; 525/480
[58] Field of Search .................... 260/841, 33.6, 33.8

[56] References Cited

U.S. PATENT DOCUMENTS

| | | | |
|---|---|---|---|
| 2,432,148 | 12/1947 | Furness et al. | 260/841 |
| 3,104,236 | 9/1963 | Lavin et al. | 260/841 |
| 3,438,922 | 4/1969 | Ueno et al. | 260/841 |

*Primary Examiner*—J. Ziegler
*Attorney, Agent, or Firm*—John A. Gazewood

[57] ABSTRACT

A thermosetting coating composition comprising the organic solvent-soluble reaction product formed by contacting at an elevated temperature at least one blocked isocyanate-functional urethane and at least one organic solvent-soluble phenolic resin, and, optionally, at least one blocked isocyanate-functional urethane. The compositions are storage-stable for extended periods and cure to a thermoset state to afford tough, durable, flexible finishes which are resistant to cracking, staining, and marring.

21 Claims, No Drawings

THERMOSETTING LACQUER COMPOSITIONS

This invention relates to polymeric coating compositions. More particularly, the invention relates to thermosetting coating compositions comprising at least one phenolic resin-urethane reaction product.

It is well-known to employ polymeric coating compositions to protect and beautify organic and inorganic substrates. In recent years, there has been a burgeoning use of such compositions for coating flat substrates which are subsequently post-formed into a diversity of products such as residential and commercial siding, rain carrying equipment, automotive trim, metal shelving, luggage, television set cabinets, miscellaneous parts for appliances and air conditioning units, venetian blinds, refuse containers, commercial truck sheeting, and the like. This "finish first, fabricate later" concept, which involves the finish coating or prepainting of flat metal stock followed by a subsequent post forming operation, is particularly attractive in the construction, mobile home, appliance, and can coating industries by virtue of greater product control capabilities and its production and cost savings, which include the freeing of valuable space taken up by paint and coating lines, chemical treatment tanks, ovens, conveyors, stacking equipment, paint rack stripping facilities, and paint and chemical storage. Other advantages afforded by coil coating processes include the elimination of sub-standard finishing rejects, elimination of handling of raw parts prior to finishing, and shortening of the production line, since work flows directly from the row-former or break-press to assembly. A significant economic advantage is the elimination of paint loss due to over spray and a reduction in the cost of painting hard to coat configurations. For example, paint loss which can run 50% or more with spray paint and 20 to 40% on other techniques is generally not more than about 5% for coil coating processes.

Coil coating is a process by which a protective coating is applied to one or both sides of coiled metal in a continuous operation. The process includes the basic steps of uncoiling the stock, treating the coil to receive the coating, coating and baking of one or more protective and/or decorative coatings, including primers and finish coats, and recoiling. The prefinished coating is subsequently formed into a desired configuration, such as an appliance shell, automobile trim, residential siding, and the like.

To meet the demands of toughness, durability, flexibility, scratch resistance, stain resistance, solvent resistance, and the like, imposed upon coating materials, both in terms of ability to withstand post forming operation and environmental use conditions, there have been developed many compositions suitable for finish coating of coil metal, including alkyd, acrylic, solution vinyl, organosols and plastisols, polyester, fluorocarbons, silicone polyesters, acrylic and vinyl films, and the like. In general, the particular finish coat which is employed in any given instance is dictated by the variables governing the manufacturing operation and the service environment of the product. Whatever the type of finish coating employed, it must be flexible, tough, hard, resistant to abrasion or chipping and possess sufficient substrate adhesion in order to withstand the rigors of the post forming operation. In addition, the coatings must afford protection to the metal substrate from under bond corrosion and provide an aesthetic appearance.

To insure the required level of adhesion and corrosion protection without diminishing the aesthetic appearance of the finished coat, the finished coat is generally applied over a primer. Corrosion inhibiting additives such as zinc chromate can generally be incorporated into any of the known primer compositions to provide underbond corrosion protection for the substrate. However, the versatility of primers which generally comprise a polymeric film former, is often limited to particular types of finish coats because of the incompatibility of different classes of polymeric materials. Thus, there is a continuous need for primer compositions which can be employed with a wider range of top coats, which can improve adhesion between the top coat and the substrates and afford corrosion protection to the substrate, and which enhance formability and flexibility of the top coats.

It is an object of this invention to provide novel urethane compositions. It is another object of the invention to provide polymeric compositions which can be cross-linked to a thermoset state. It is yet another object of the invention to provide thermosettable coating compositions which are storage-stable at ambient conditions. These and other objects, aspects, and advantages of the invention will be apparent to those skilled in the art upon consideration of the accompanying disclosure.

In accordance with this invention, it has been discovered that isocyanate-functional polyurethanes, hereafter urethanes, can be reacted with certain phenolic resins to afford thermoplastic urethane-phenolic resin adducts which can be readily cured to a thermoset state. Such adducts are especially suitable in forming coating compositions, primers, binders for particulate materials, and the like.

Thus, in accordance with one aspect of the present invention, there are provided novel thermoplastic urethane-phenolic resin compositions comprising the reaction product of a phenolic resin and an urethane.

In another aspect of the invention, there is provided a process for preparing thermoplastic urethane-phenolic resin compositions.

In yet another aspect of the invention there are provided novel thermosetting coating compositions which are especially suitable for coating inorganic, especially metal, substrates. The coating compositions of the invention have a prolonged stability at ambient conditions, even in the presence of moisture, and readily cross-link, i.e., cure at moderately elevated temperatures to form tough, flexible, durable, scratch resistant, mar resistant, and stain resistant coatings. The fully-cured coatings exhibit excellent adhesion to a variety of inorganic substrates, especially metal substrates. In addition, the baked thermoset coatings are exceptionally flexible, permitting substrates coated with the invention compositions to be formed into any shape or form with the coating showing essentially no sign of cracking, flaking, or loss of adhesion, even on small radius bends. The flexibility and formability of the invention compositions after baking affords protection against underbond corrosion to the substrates. The excellent properties of formability, flexibility, adhesion, and corrosion resistance of the baked coatings make the herein described compositions particularly suitable as primers for coil coating processes. A particularly unexpected feature of the herein described coatings is their versatility, that is, they can be employed in combination with a wide range of polymeric coating compositions including alkyd, acrylic, vinyl, polyester, and silicone-containing coating compositions, as well as acrylic and vinyl films. Another significant advantage is that the benefits provided by the herein described compositions are obtained at reduced film thicknesses than are normally employed commercially.

The novel coating compositions of this invention consist essentially of at least one organic solvent-soluble urethane-phenolic resin reaction product, preferably in admixture wth at least one blocked isocyanate-terminated urethane, and optionally containing fillers, pigments, and the like conventional additives, particularly corrosion inhibiting additives such as zinc chromate and strontrium chromate. After the compositions are applied to a substrate, they cure by heating to a solid insoluble infusible finish which is tough, flexible, durable, scratch resistant, mar resistant and stain resistant. Substrates coated with the cured compositions of this invention can be post formed, for example, into outdoor siding, appliance parts, automobile trim, and the like, with little, if any, cracking or other coating failure.

More particularly, the novel urethane-phenolic resin compositions of the present invention comprise the reaction product or adduct of a blocked isocyanate-functional urethane and a heat-hardening organic solvent-soluble phenolic resin. It is an essential feature of the invention that such urethane-phenolic resin adducts be formed by reacting (a) a blocked isocyanate-functional urethane and (b) an organic solvent-soluble heat-hardening phenolic resin at a temperature sufficient to (i) cause dissociation of the blocked urethane and (ii) initiate the reaction between the thus regenerated urethane and the phenolic resin. The urethane-phenolic resin compositions of the invention are thermoplastic in nature; a result which is especially surprising since contact of an unblocked isocyanate-functional urethane and a hydroxyl-rich phenolic resin results in a crosslinked product, even at ambient temperatures.

The isocyanate-functional urethanes which can be employed in forming blocked urethanes suitable for use in preparing the urethane-phenolic resin compositions of the present invention comprise the reaction product between one or more organic compounds having at least two active hydrogen atoms and a stoichiometric excess of at least one polyisocyanate. Generally, such isocyanate-functional urethanes will be prepared by reacting a polyol, polyether, hydroxyl-terminated polyester, polyester amide, polyamide, or other polyfunctional active hydrogen compound with a diisocyanate or other polyisocyanate having up to eight functional isocyanate groups. Preferred reactants include polyhydroxy polyesters, polyhydroxy polyethers and polyisocyanates having two or three reactive isocyanate groups. An extensive description of some of the useful techniques for preparing isocyanate-functional urethanes can be found in Saunders and Frisch: *Polyurethanes, Chemistry and Technology*, Part II, Interscience (New York 1964), especially at pages 8 to 49, and in the references cited therein. Other preparative techniques which are known in the art can also be employed. Generally, any isocyanate-functional urethane known in the art can be employed in the practice of this invention, with such urethanes having a molecular weight of at least 500, particularly in the range of 1,000 to 10,000, being preferred.

Any of the polyisocyanates having at least two reactive isocyanate groups can be employed in forming isocyanate-functional urethanes suitable for use in the practice of the invention. Such polyisocyanates include, without limitation, aliphatic polyisocyanates such as 1,6-hexamethylene diisocyanate; 1,8-octamethylene diisocyanate; 1,12-dodecamethylene diisocyanate; 2,2,4-trimethylhexamethylene diisocyanate; and the like; 3,3'diisocyanatodipropyl ether; 3-isocyanatomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)-fumarate; 4-methyl-1,3-diisocyanatocyclohexane; trans-vinylene diisocyanate and similar unsaturated polyisocyanates; 4,4'-methylene-bis-(cyclohexylisocyanate) and related polyisocyanates; methane diisocyanates; bis-(2-isocyanatoethyl) carbonate and similar carbonate polyisocyanates; N,N'N''-tris-(6-isocyanatohexamethylene) biuret and related polyisocyanates; as well as other known polyisocyanates derived from aliphatic polyamines; aromatic polyisocyanates such as toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanates; tetrachloro-1,3-phenylene diisocyanate; and the like.

In forming the blocked urethanes, the isocyanate-functional urethanes can be blocked employing conventional techniques with any of the known blocking agents, including, without limitation, monohydroxy compounds such as aliphatic and aromatic monoalcohols, e.g., methanol, ethanol, isopropanol, phenol, and the like; or any compound containing enolizable hydrogen, such as acetoacetate ester, diethyl malonate, ethyl benzoyl malonate, acetyl acetone, acetynol acetone, and the like. Preferred blocking agent include hydroxy, oxime, and ketoxime blocking agents, such as acetophenone oxime, butyraldoxime, acetone oxime, 2-butanone oxime, 3-methyl-2-butanone oxime, 3-pentanone oxime, 4-methyl-2-pentanone oxime, cyclohexanone oxime, methyl ethyl ketoxime, methyl methyl ketoxime, and the like. The ketoxime-blocked urethanes are preferred because of their lower blocking temperature, improved cure temperature properties, and improved stability. It is preferred to employ the blocking agent in a ratio of equivalents by weight of active isocyanate functions to blocking agent in a range from about 1:1 to about 1:4. Of course, mixtures of the different blocking agents, as well as two or more different isocyanate-functional urethanes, can be used.

As the phenolic resin there can be employed the organic solvent-soluble heat-reactive condensation product of an aldehyde having from 1 to 8 carbon atoms, such as formaldehyde, acetaldehyde, isobutyraldehyde, ethylhexaldehyde, and the like, with phenolic compounds such as phenol, o-cresol, m-cresol, p-cresol, mixed cresols, e.g., cresylic acid and m-cresol and/or p-cresol, xylenol, diphenylolpropane, p-butylphenol, p-tert-amylphenol, p-octylphenol, p,p'-dihydroxydiphenylether, and the like. Presently preferred are the condensation products of formaldehyde with phenol, o-cresol, m-cresol or p-cresol.

The phenolic resin will preferably be formed in a conventional manner from the condensation of from about 0.8 to about 5 mols of aldehyde per mol of phenolic compound in the presence of basic, neutral or acidic catalysts to afford an organic solvent-soluble resin having a molecular weight in the range from about 300 to about 2,000, preferably about 300 to about 1,200. Phenolic resins prepared in the presence of basic or neutral catalysts, especially ammonia, are preferred at the present time. The phenolic resin is preferably compatible with the blocked polyurethane coreactant, and hence it is a critical feature of the invention that the phenolic resin be soluble in an organic solvent system which is substantially free of alcohols.

To form the novel urethane-phenolic resin compositions of the present invention, the phenolic resin and the blocked urethane are preferably dissolved in a substantially anhydrous organic solvent medium. Any non-reactive volatile mutual or compatible solvent for the resinous components may be used, such as ethylene dichloride, trichloroethylene, and the like, including mixed solvent systems comprising esters, hydrocarbons, and the like. In selecting the blocked urethane, phenolic resin and solvent system, it is an important criterion that the selected ingredients be sufficiently compatible so as to form an essentially homogeneous admixture. Generally, the phenolic resin and blocked urethane will be combined in proportions ranging from about 9 parts urethane: 1 part phenolic resin to about 1 part urethane: 9 parts phenolic resin, with a range from about 4 parts urethane: 6 parts phenolic resin to about 7 parts urethane: 3 parts phenolic resin being preferred. The solvent system will generally be present in an amount to provide an admixture of resinous components in solvent at a total solids content in the range from about 10 to about 70, preferably from about 25 to about 65, percent. The resin-solvent admixture is heated at an elevated temperture sufficient to dissociate the blocked isocyanate-functional urethane into a polymer having at least one reactive isocyanate group and to initiate the reaction between the thus unblocked urethane and the hydroxyl-rich phenolic resin. Heating is continued at the elevated temperature to substantial dehydration of the reaction mixture. After complete dehydration, the reaction mixture is adjusted to a solids content in the range from about 30 to about 80, preferably from about 40 to about 70, percent total solids content. The resin is then ready to be used as a clear coating, e.g., food and beverage can coatings, or can be pigmented with suitable additives, e.g., corrosion resisting additives, to produce a primer suitable for use as a coil coating. Suitable solvents which can be used to dilute the resinous coating compositions of this invention include toluene, xylene, ethyl acetate, butyl acetate, monoethylether acetate, acetone, methyl isobutyl ketone, and other aliphatic, cycloaliphatic, and aromatic hydrocarbons, ethers, esters and ketones which are non-reactive with the constituents of the resin compositions.

In preferred embodiments, particularly where improved flexibility is desired, the novel compositions of the present invention will contain, in addition to the urethane-phenolic resin adduct, from about 5 to about 50 percent by weight, based on the weight of urethane-phenolic resin adduct, of at least one blocked isocyanate-functional urethane, with the total solids content of such compositions being as set forth, supra. Preferably, the added blocked isocyanate-functional urethane will be the same as that used in forming the urethane-phenolic resin adduct.

As previously noted, the compositions of the invention can include conventional additives such as pigments, fillers, and the like; with such additives being used in conventional amounts. Particularly preferred additives include coloring pigments and corrosion inhibiting materials such as zinc chromate, strontium chromate, and the like.

The novel coating compositions of the invention can be applied to a variety of substrates including steel, aluminum, zinc, and other metals by conventional techniques of brushing, spraying, flow-coating, dip-coating, coil-coating, roller-coating, or electro deposition. After the coating is applied, it is baked for from 1 minute to about 30 minutes at 350° to 750° F.

The novel coating compositions of this invention preferably is applied over suitably treated primed metal substrates such as a steel substrate treated with zinc phosphate or the compositions can be used directly over galvanized steel or aluminum.

The novel compositions of this invention form a finish which is hard, flexible, durable, weatherable, scratch and grease resistant which makes the coating compositions particularly suitable as primers for applications such as truck bodies, auto bodies, airplane equipment, railroad equipment, vending machines, outdoor equipment, outdoor metal siding such as aluminum siding, and the like. The novel compositions are particularly useful in coil coating wherein the coated metal sheet material is to be subjected to post forming techniques; for example, coated aluminum for outdoor siding and coated sheets for parts of appliances. The extreme flexibility, durability, scuff and mar resistance of the finish make these particular end uses possible. When example as primers in coil coating applications, the compositions of this invention can be used in combination with urethane, alkyd, acrylic, vinyl (solution, organosol and plastisol), polyester, and silicone-containing finish coatings.

The following examples are provided to more fully illustrate the invention. In these examples, all proportions are by weight unless otherwise indicated.

EXAMPLE I

A mixture comprising 752 g phenol, 252 g formaldehyde, 80 g toluene, 512.5 g water, and 40 ml concentrated ammonia was heated at 91°–118° C. under reflux to substantially complete dehydration of the reaction mixture. The reaction product was cooled to room temperature and the toluene was extracted under vacuum to afford a substantially anhydrous toluene-soluble A-stage phenolic resin having a molecular weight of approximately 300.

EXAMPLE II

To a mixture comprising 60 parts by weight of an isocyanate-terminated urethane having a molecular weight of about 3,000, prepared from polycaprolactone and toluene diisocyanate, 25 parts by weight toluene and 75 parts by weight Cellosolve acetate, there was added 40 parts by weight of the phenolic resin prepared according to the procedure of Example I. The resulting admixture was stirred at room temperature. Gelation occurred after about 30 minutes.

EXAMPLE III

An isocyanate-functional urethane having the same physical and chemical properties as the urethane employed in Example II was blocked in a conventional manner, utilizing a slight excess of methyl ethyl ketoxime. To 60 parts by weight of the thus methyl ethyl ketoxime-blocked isocyanate-functional urethane there was sequentially added a mixed solvent (25 parts by weight toluene and 75 parts by weight Cellosolve acetate) and 40 parts by weight of the phenolic resin prepared according to the procedure of Example I. The resulting admixture was heated for two hours at a temperature of 125°–134° C. to afford an organic solvent soluble urethane-phenolic regin reaction product. The reaction mixture was adjusted to a total solids content of 50 percent. A sample stored at room temperature had substantially no increase in viscosity after three months.

EXAMPLE IV

A mixture comprising 922 parts by weight of the A-stage phenolic resin prepared according to the procedure of Example I, 1,692 parts by weight of the methyl ethyl ketoxime-blocked urethane employed in Example III, 130 parts by weight, toluene and 1579 parts by weight Cellosolve acetate was heated for two hours at 125° C.–139° C. to afford a substantially anhydrous organic solvent-soluble urethane-phenolic resin adduct.

The thus-prepared adduct was employed to prepare a flexible baking primer according to the recipe:

| Ingredient | Parts by Weight |
|---|---|
| Zinc chromate | 100 |
| Fumed silica | 10 |
| Adduct | 230 |
| Cellosolve acetate | 150 |
| Methyl ethyl ketone | 150 |

The ingredients were combined in a conventional manner by milling on a Kady mill, with the temperature being maintained below 55° C., to obtain a substantially homogeneous fluid.

To the freshly milled composition there was added 10 parts by weight, based on 100 parts by weight of adduct, of the methyl ethyl ketoxime urethane employed in forming the adduct of this example.

The thus-prepared primer composition comprising adduct and blocked urethane was sprayed onto solvent-degreased aluminum coil stock to provide a coating having a dry film thickness of 0.2–0.3 mil. After drying, the primed stock was baked for two minutes at 260° C. After cooling, separate pieces of the baked primer-coated stock were individually coated on both sides by spraying with aluminum-pigmented polyurethane-based, yellow-pigmented polyurethane-based, and clear polyurethane-based top coatings, respectively. The coated stock was moisture-cured at room temperature for 7 days.

The thus-treated aluminum stock passed O-T bend tests and 20-40-60 impact flexibility test (Federal Test Method Standard No. 141a, Method 6226, September 1965). This latter test is employed for light stocks such as aluminum and provides a procedure for determining the ability of a coating to resist shattering, cracking or chipping when the coating and substrate are distended beyond their original form by impact. The highest area of distensibility in which there are no film breaks is reported as the percent elongation or flexibility which the coating will stand. Maximum elongation according to this method is 60 percent. There was no loss of adhesion in the distended areas.

EXAMPLE V

The primer composition of Example IV comprising urethane-phenolic resin adduct and blocked urethane was applied to phosphatized cold rolled steel coil stock and chromatized galvanized steel coil stock, respectively. Dry film coating thickness was approximately 0.2 mil. The primed stock was baked for two minutes at 260° C. The baked primer-coated stock passed solvent resistance (minimum 100 wipes with methyl ethyl ketone), O-T bend, Gardner direct and reverse impact tests at maximum loading of 160 inch-pounds according to the procedure of ASTM D-2794-69, and dry and wet adhesion tests. In the dry adhesion test, the baked film is X-scored, adhesive Scotch-tape is applied to the scored surface and removed sharply with a pull at right angles to the test surface and the extent of adhesive failure noted. The wet adhesion test is performed in the same manner, except that the baked film is immersed in water at room temperature for 24 hours prior to scoring.

EXAMPLE VI

The urethane-phenolic resin adduct of Example III is employed to prepare a flexible baking primer according to the recipe:

| Ingredient | Party by Weight |
|---|---|
| Zinc chromate | 128 |
| Fumed silica | 13 |
| Adduct (Example III) | 294 |
| Cellosolve acetate | 150 |
| Methyl ethyl ketone | 150 |

The ingredients are blended in a conventional manner on a Kady mill at a temperature below 56° C. to obtain a substantially homogeneous fluid.

The thus-prepared primer composition is coated onto chromatized galvanized steel stock and baked for 2 minutes at 260° C. After cooling, the baked primer-coated stock is coated with polyurethane-based finish coating. The thus-prepared stock is baked for 2 minutes at 260° C.

The thus-treated galvanized steel stock passes dry and wet adhesion tests, O-T bend tests, solvent resistance tests, and Gardner direct and reverse impact texts at maximum loading of 160 inch-pounds.

EXAMPLE VII

The primer composition of Example IV is applied to phosphatized cold rolled steel coil. Dry film coating thickness is approximately 0.2 mil. The primed stock is baked for two minutes at 260° C. The stock is cooled and separate pieces of the baked primed stock are individually coated with alkyd, vinyl plastisol, vinyl organosol, polyester, and silcone-polyester finish coatings, respectively. The finish-coated stock is baked for two minutes at 260° C., quenched, and post-formed into a variety of shapes such as a building panel. The flexibility of the baked primer coating is seen to significantly improve performance of the various finish coats.

What is claimed is:

1. Polyurethane-phenolic resin adducts comprising the organic solvent-soluble reaction product formed by contacting a blocked isocyanate-functional polyurethane and an organic solvent-soluble phenolic resin at a temperature sufficient to dissociate said blocked polyurethane and initiate reaction between said polyurethane and said phenolic resin.

2. Polyurethane-phenolic resin adducts according to claim 1 wherein said reaction between said polyurethane and said phenolic resin is continued to the point of substantially complete dehydration of the reaction mixture.

3. Polyurethane-phenolic resin adducts according to claim 2 wherein said phenolic resin comprises the reaction product of an aromatic hydroxy compound and an aldehyde having from 1 to 8 carbon atoms.

4. Polyurethane-phenolic resin adducts according to claim 3 where said phenolic resin is formed by effecting reaction between said aromatic hydroxy compound and said aldehyde in the presence of at least one neutral or basic catalyst.

5. Polyurethane-phenolic resin adducts according to claim 4 wherein said catalyst is ammonia.

6. Polyurethane-phenolic resin adducts according to claim 5 wherein said aromatic hydroxy compound is o-cresol.

7. Polyurethane-phenolic resin adducts according to claim 2 wherein said phenolic resin has a molecular weight in the range of about 300 to about 1,200, and said polyurethane has a molecular weight of at least 500.

8. Polyurethane-phenolic resin adducts according to claim 7 wherein said polyurethane has a molecular weight in the range from about 1,000 to about 10,000.

9. Polyurethane-phenolic resin adducts according to claim 8 wherein said phenolic resin comprises the reaction product of an aromatic hydroxy compound and an aldehyde having from 1 to 8 carbon atoms.

10. Polyurethane-phenolic resin adducts according to claim 9 wherein said phenolic resin is formed by effecting reaction between said aromatic hydroxy compound and said aldehyde in the presence of at least one neutral or basic catalyst.

11. Polyurethane-phenolic resin adducts according to claim 10 wherein the equivalent ratio of aromatic hydroxy compound: aldehyde is in the range from about 1:0.8 to about 1:5.

12. Polyurethane-phenolic resin adducts according to claim 11 wherein said aromatic hydroxy compound is o-cresol.

13. Polyurethane-phenolic resin adducts according to claim 11 wherein said catalyst is ammonia.

14. Polyurethane-phenolic resin adducts according to claim 13 wherein said aromatic hydroxy compound is o-cresol.

15. Polyurethane-phenolic resin adducts according to claim 14 wherein said polyurethane comprises a ketoxime-blocked isocyanate-functional polyurethane.

16. Polyurethane-phenolic resin adducts according to claim 15 wherein said ketoxime-blocked isocyanate-functional polyurethane is derived from polycaprolactone.

17. A thermosetting coating composition comprising at least one polyurethane-phenolic resin adduct as defined in claim 1 and an inert organic solvent therefor.

18. A coating composition according to claim 17 having a total solids content in the range from about 30 to about 80 percent.

19. A thermosetting coating composition according to claim 17 containing from about 5 to about 50 weight percent, based on the weight of said adduct, of at least one blocked polyurethane.

20. A thermosetting coating composition according to claim 18 containing from about 5 to about 50 weight percent, based on the weight of said adduct, of at least one blocked polyurethane.

21. A process for the preparation of polyurethane-phenolic resin adducts which comprises contacting at least one blocked isocyanate-functional polyurethane and at least one organic solvent-soluble phenolic resin at a temperature sufficient to cause dissociation of at least one blocked isocyanate group of said polyurethane and initiate reaction between said polyurethane and said phenolic resin.

* * * * *